(12) United States Patent
Hong et al.

(10) Patent No.: US 8,243,052 B2
(45) Date of Patent: Aug. 14, 2012

(54) DISPLAY APPARATUS AND INFORMATION UPDATE METHOD THEREFOR

(75) Inventors: Yun-ju Hong, Suwon-si (KR); Young-kyan Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 708 days.

(21) Appl. No.: 11/844,540

(22) Filed: Aug. 24, 2007

(65) Prior Publication Data
US 2008/0051914 A1 Feb. 28, 2008

(30) Foreign Application Priority Data
Aug. 24, 2006 (KR) .................. 10-2006-0080705

(51) Int. Cl.
*G09G 5/00* (2006.01)
(52) U.S. Cl. ................... 345/204; 717/168
(58) Field of Classification Search ............... 345/204, 345/501–506, 519, 520, 522, 530–538, 554
See application file for complete search history.

(56) References Cited

U.S. PATENT DOCUMENTS

| | | | | |
|---|---|---|---|---|
| 5,878,256 | A * | 3/1999 | Bealkowski et al. ............. 713/2 |
| 6,115,814 | A | 9/2000 | Lieber et al. | |
| 6,282,709 | B1 * | 8/2001 | Reha et al. ................. 717/175 |
| 6,581,157 | B1 * | 6/2003 | Chiles et al. ................. 713/1 |
| 6,622,246 | B1 * | 9/2003 | Biondi ......................... 713/100 |
| 6,807,641 | B1 * | 10/2004 | Ishiguro et al. ............... 714/6.3 |
| 7,376,870 | B2 * | 5/2008 | Kataria et al. ............... 714/47.1 |
| 7,446,761 | B2 * | 11/2008 | Tseng ........................ 345/204 |
| 7,809,756 | B2 * | 10/2010 | Barney et al. ................ 707/793 |
| 2002/0180718 | A1 * | 12/2002 | La .............................. 345/204 |
| 2003/0084232 | A1 | 5/2003 | Pang | |
| 2003/0189562 | A1 * | 10/2003 | Tsai ............................ 345/204 |
| 2008/0046997 | A1 * | 2/2008 | Wang .......................... 726/16 |

FOREIGN PATENT DOCUMENTS

EP 1457880 A1 9/2004
KR 10-2002-0037112 A 5/2002

OTHER PUBLICATIONS

"Philips LCD TV", Philips User Manual. Dec. 19, 2005, pp. 1-46. XP002530531.
Office Action issued on May 25, 2011 in the corresponding Chinese Patent Application No. 200710182148.1.
Communication dated Jan. 30, 2012, issued by the State Intellectual Property Office of P.R. China in counterpart Chinese Application No. 200710182148.1.
Communication dated Jun. 11, 2012 issued by the State Intellectual Property Office of P.R. China in counterpart Chinese Patent Application No. 200710182148.1.

* cited by examiner

*Primary Examiner* — Duc Dinh
(74) *Attorney, Agent, or Firm* — Sughrue Mion, PLLC

(57) ABSTRACT

A display apparatus includes: a display part; a storing part which stores first driving data for driving the display part; a data interface which receives second driving data from an external apparatus; and a controller which updates the first driving data with the second driving data after receiving an instruction to update the first driving data.

10 Claims, 3 Drawing Sheets

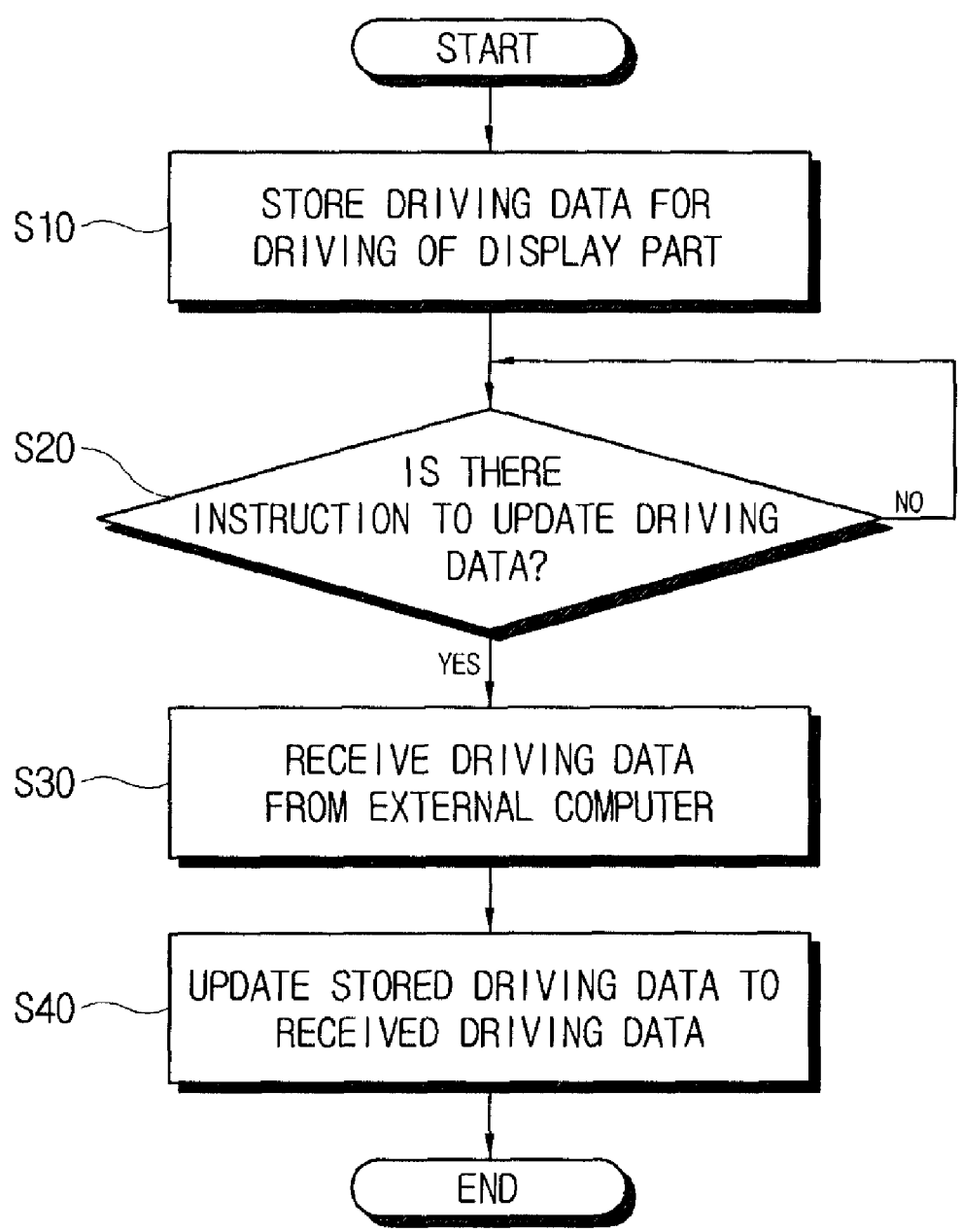

DISPLAY APPARATUS AND INFORMATION UPDATE METHOD THEREFOR

CROSS-REFERENCE TO RELATED APPLICATIONS

This application claims priority from Korean Patent Application No. 10-2006-0080705, filed on Aug. 24, 2006, the disclosure of which is incorporated herein by reference in its entirety.

BACKGROUND OF THE INVENTION

1. Field of the Invention

Apparatuses and methods consistent with the present invention relate to display apparatuses and information update methods therefor, and more particularly, to a display apparatus that controls a flash memory in which driving information is stored, and an information update method therefor.

2. Description of the Related Art

A display apparatus receives and processes a video signal and then outputs the processed video signal in a displayable format. A display apparatus requires a driver and various kinds of driving information including an algorithm for video processing. A microcontroller included in the display apparatus performs the video processing based on such driving information which is also called microcontroller unit (MCU) code. A display apparatus stores the driving information in a storage unit, such as a flash memory, provided inside or outside the microcontroller.

However, since a display apparatus can not function normally if the driving information is damaged, the flash memory is designed to prohibit an update of the driving information that is stored during the manufacturing of the display apparatus. Accordingly, if it is necessary to update the driving information, then the flash memory itself must be replaced, which results in inconvenience to a user as well as an increase of costs.

SUMMARY OF THE INVENTION

Accordingly, it is an aspect of the present invention to provide a display apparatus and an information update method therefor, which are capable of securely protecting driving information stored in a flash memory and of updating the driving information without difficulty by updating the driving information, only if necessary, based on a user's instruction related to the update of the driving information stored in the flash memory.

Aspects of the present invention can be achieved by providing a display apparatus comprising: a display part; a storing part in which first driving data for driving of the display part is stored; a data interface that receives second driving data from an external apparatus; and a controller that updates the first driving data to the second driving data upon receiving an instruction to update the first driving data from a user.

According to an exemplary embodiment of the present invention, the display apparatus further comprises a user input part, wherein the controller updates the first driving data to the second driving data upon receiving the instruction to update the first driving data through the user input part.

According to an exemplary embodiment of the present invention, the controller updates the first driving data to the second driving data upon receiving the instruction to update the first driving data through the data interface.

According to an exemplary embodiment of the present invention, when the update of the first driving data to the second driving data has ended, the controller makes it impossible to update the second driving data with the first driving data.

According to an exemplary embodiment of the present invention, the display apparatus further comprises a UI generating part that generates an UI image for the update of the first driving data, wherein the controller displays the generated UI image on the display part and updates the first driving data to the second driving data according to a selection of the UI image upon receiving the instruction to update the first driving data.

According to an exemplary embodiment of the present invention, the first and second driving data comprise microcontroller unit (MCU) code data.

Aspects of the present invention can be achieved by providing an information update method of a display apparatus, the method comprising: storing first driving data for driving of the display apparatus; receiving an instruction to update the first driving data from a user; receiving second driving data from an external apparatus upon receiving the instruction to update the first driving data from the user; and updating the first driving data to the second driving data.

According to an exemplary embodiment of the present invention, the receiving the instruction to update the first driving data from the user comprises receiving the instruction to update the first driving data through the external apparatus.

According to an exemplary embodiment of the present invention, the information update method further comprises, when the update of the first driving data to the second driving data has ended, making it impossible to update the second driving data with the first driving data.

According to an exemplary embodiment of the present invention, the first and second driving data comprise microcontroller unit (MCU) code data.

BRIEF DESCRIPTION OF THE DRAWINGS

The above and/or other aspects of the present invention will become apparent and more readily appreciated from the following description of exemplary embodiments of the present invention, taken in conjunction with the accompanying drawings, in which:

FIG. 2 is a flow chart illustrating an information update method of the display apparatus according to the embodiment of the present invention.

DETAILED DESCRIPTION OF EXEMPLARY EMBODIMENTS OF THE PRESENT INVENTION

Reference will now be made in detail to exemplary embodiments of the present invention, examples of which are illustrated in the accompanying drawings.

Figure 1A:
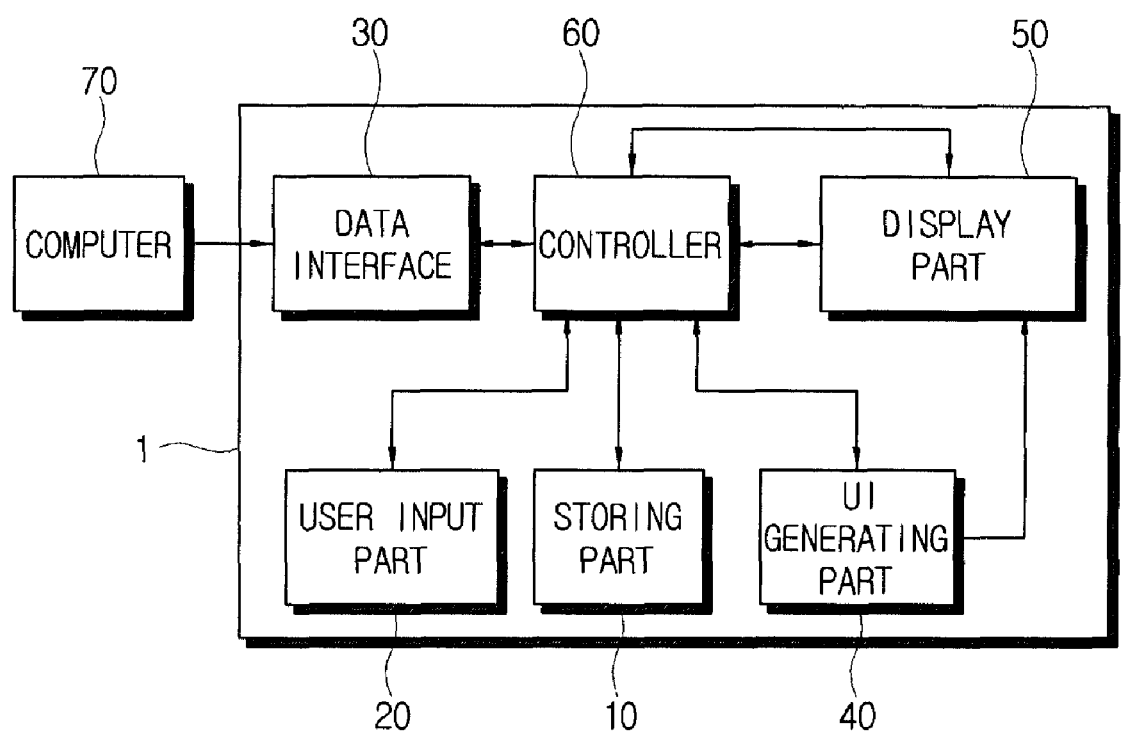
FIGS. 1A and 1B are block diagrams showing a configuration of a display apparatus according to an embodiment of the present invention.

FIG. 1A is a control block diagram showing a configuration of a display apparatus according to an exemplary embodiment of the present invention. As shown in FIG. 1A, a display apparatus 1 comprises a storing part 10, a user input part 20, a data interface 30, a User Interface (UI) part 40, a display part 50 and a controller 60. In the following description, a monitor is exemplified as the display apparatus 1.

Driving data is stored in the storing part 10, based on which the controller 60, which will be described in detail below, drives the display part 50. The driving data comprises MCU code data and the storing part 10 is embodied by a nonvolatile memory such as a flash memory or the like.

The display apparatus 1 receives an instruction to update the driving data stored in the storing part 10 from a user through the user input part 20. Alternatively, a user may transmit an instruction to update the driving data stored in the storing part 10 by manipulating a keyboard, a mouse, or the like, which is provided in an external computer 70.

If the user inputs an instruction to update the driving data to the display apparatus 1 through the external computer 70, then the external computer 70 may be connected to the data interface 30 via a display data channel (DDC) line to transmit the driving data to be updated, and the instruction to update the driving data, to the display apparatus 1.

In addition, as an alternative exemplary embodiment, the user may input an instruction to update the driving data to the display apparatus 1 by manipulating a combination of keys of the keyboard provided on the external computer 70, or by pushing a particular key of the keyboard for a specified period of time, or by clicking a mouse for a specified period of time. Additionally, the user may input an instruction to update the driving data by selecting an UI image generated by the UI generating part 40 which will be described in detail below.

On the other hand, the user may be informed of a storage location of the driving data in the external computer 70 through the user input part 20.

The data interface 30, which receives the driving data from the external computer 70, may be embodied, for example, by a slot through which a cable is connected to the external computer 70. In addition, the data interface 30 may transmit the user's instruction to update the driving data, which is received from the external computer 70, to the controller 60.

The UI generating part 40 generates a UI image for the update of the driving data stored in the storing part 10. The user may select whether to update the driving data through the UI image generated by the UI generating part 40. The UI image generated by the UI generating part 40 may comprise not only an interface to select whether to update the driving data, but also an interface to select a location at which new driving data are stored in the external computer 70.

The display part 50 displays the UI image generated by the UI generating part 40. The user may instruct the controller 60 to update the driving data through the user input part 20 according to a selection of the UI image displayed on the display part 50 and the user may assign the location at which the new driving data are to be stored.

When the user inputs an instruction to update the driving data by pushing an update selection key provided in the user input part 20, the controller 60 updates the driving data stored in the storing part 10 to the driving data received through the data interface 30.

The MCU code data which is used as the driving data for the driving of the display part 50 is stored in the storing part 10, and it is common that the driving data stored in the storing part 10 is set such that it can not be updated in order to prevent damage of the MCU code data.

Figure 1B:
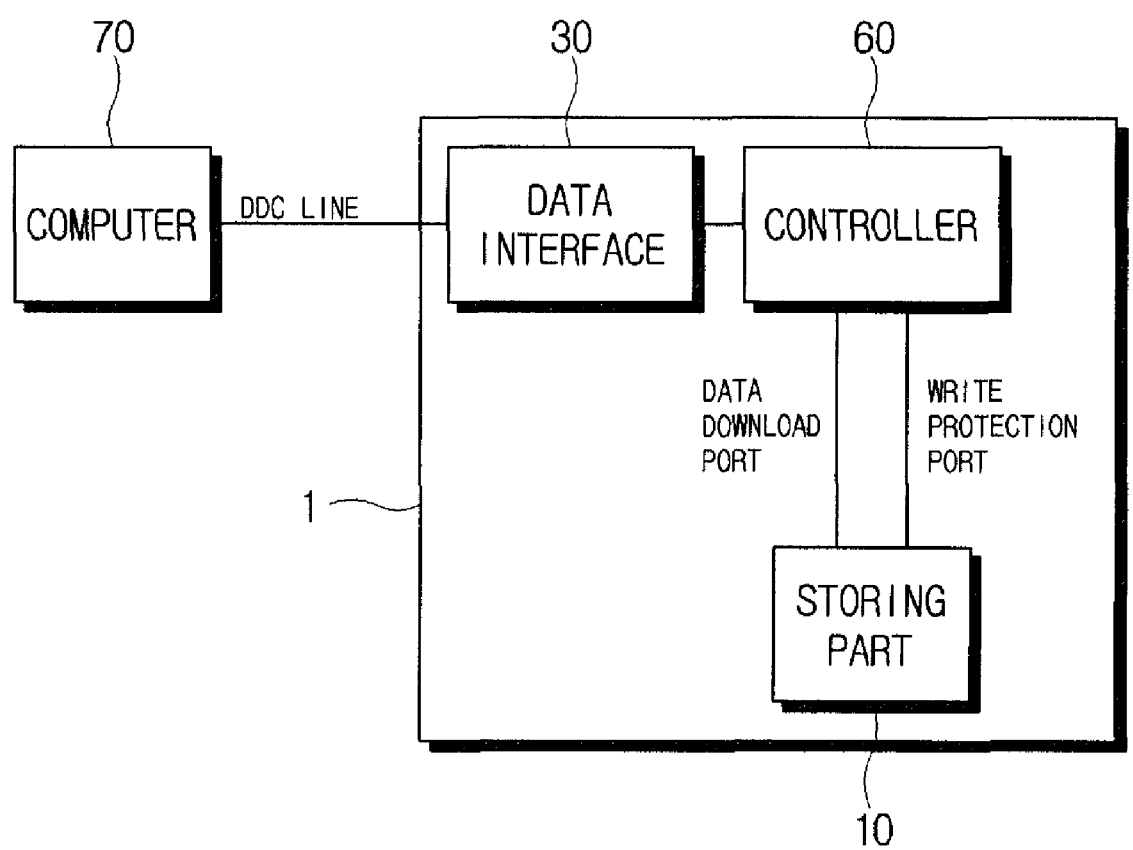

In this exemplary embodiment, as shown in FIG. 1B, the controller 60 and the storing part 10 are further provided with a data download port for transmission/receipt of the driving data and a write protection port for transmission of a signal to permit or prohibit the update of the driving data. Accordingly, when the user inputs the instruction to update the driving data, the controller 60 transmits a signal to permit the update of the driving data to the write protection port provided in the storing part 10, through a general purpose input/output (GPIO) pin, and then transmits the driving data received from the external computer 70 to the storing part 10, through the data download port, so that the driving data stored in the storing part 10 can be updated.

On the other hand, when receipt of the driving data from the external computer 70 is completed, and the update of the driving data stored in the storing part 10 has ended, the controller 60 transmits a signal to prohibit update of the driving data to the write protection port provided in the storing part 10, through the general purpose input/output (GPIO) pin, so that the driving data stored in the storing part 10 can be prevented from being damaged.

Although it has been illustrated in this exemplary embodiment that the display apparatus 1 receives the driving data from the external computer 70 through the data interface 30, the display apparatus 1 may receive driving data from all devices or apparatuses that can store the driving data, in addition to the external computer 70, consistent with the present invention.

Hereinafter, an information update method of the display apparatus 1 according to an exemplary embodiment of the present invention will be described with reference to FIG. 2.

First, the controller 60 stores the driving data, for the driving of the display part 50, in the storing part 10 at operation S10. Next, the controller 60 receives an instruction to update the driving data from a user at operation S20. At the operation S20, the controller 60 may receive either an instruction to update the driving data from the user through the external computer 70 or an instruction to update the driving data from the user through the user input part 20 provided in the display apparatus 1.

Next, upon receiving the instruction to update the driving data at the operation S20, the controller 60 receives the driving data from the external computer 70 at operation S30. Finally, the controller 60 updates the driving data stored in the storing part 10 to the driving data received from the external computer 70 at operation S40. When the update of the driving data stored in the storing part 10 has ended at the operation S40, the controller 60 may transmit a signal prohibiting an update of the updated driving data to the storing part 10.

As described above, since the driving data stored in the storing part 10 can be updated only when the driving data is received from the external computer 70, the driving data can be prevented from being damaged.

As is apparent from the above description, exemplary embodiments of the present invention provide a display apparatus and an information update method therefor, which are capable of securely protecting driving information stored in a flash memory of the display apparatus by receiving a MCU code from an external computer only when a user wishes to do so and by thereafter updating an MCU code stored in the flash memory to the received MCU code.

In addition, exemplary embodiments of the present invention provide a display apparatus and an information update method therefor, which are capable of updating the driving information without difficulty since a user can instruct a controller to update driving information by means of an input key provided in the display apparatus or through an external computer.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:

a display part;

a storing part which stores first driving data for driving the display part;

a data interface which receives second driving data from an external apparatus;

a write protection port which transmits a signal to set a write protection state of the stored first driving data to permit or prohibit an update of the stored first driving data;

a data download port which transmits the second driving data;

a controller which transmits a signal to permit the update of the stored first driving data to the storing part through the write protection port and updates the stored first driving data with the second driving data through the data download port after receiving an instruction to update the first driving data; and a user input part, wherein the controller updates the first driving data with the second driving data after receiving the instruction to update the first driving data via the user input part, and wherein, when the update of the first driving data with the second driving data has ended, the controller prohibits updating the second driving data with the first driving data by transmitting a signal to prohibit the update of the second driving data to the storing part through the write protection port.

2. The display apparatus according to claim 1, wherein the controller updates the first driving data with the second driving data after receiving the instruction to update the first driving data via the data interface.

3. The display apparatus according to claim 2, further comprising a user interface (UI) generating part which generates an UI image for updating the first driving data, wherein the controller displays the generated UI image on the display part, and wherein the controller updates the first driving data with the second driving data in accordance with a selection of the generated UI image after receiving the instruction to update the first driving data.

4. The display apparatus according to claim 1, further comprising a UI generating part which generates an UI image for updating the first driving data, wherein the controller displays the generated UI image on the display part, and wherein the controller updates the first driving data with the second driving data in accordance with a selection of the generated UI image after receiving the instruction to update the first driving data.

5. The display apparatus according to claim 1, wherein the first driving data and the second driving data comprise microcontroller unit (MCU) code data.

6. An information update method for a display apparatus the method comprising:

storing first driving data for driving the display apparatus;

receiving an instruction to update the first driving data;

receiving second driving data from an external apparatus, which is external to the display apparatus, after receiving the instruction to update the first driving data;

transmitting a signal to set a write protection state of the stored first driving data to permit the update of the stored first driving data through a write protection port;

updating the first driving data with the second driving data through a data download port; and when the update of the first driving data with the second driving data has ended, prohibiting updating the second driving data with the first driving data by transmitting a signal to prohibit the update of the second driving data through the write protection port, wherein the updating the first driving data with the second driving data comprises updating the first driving data with the second driving data after receiving the instruction to update the first driving data via a user input part of the display apparatus.

7. The information update method according to claim 6, wherein the receiving the instruction to update the first driving data comprises receiving the instruction to update the first driving data via the external apparatus.

8. The information update method according to claim 7, wherein the first driving data and the second driving data comprise microcontroller unit (MCU) code data.

9. The information update method according to claim 6, wherein the first driving data and the second driving data comprise microcontroller unit (MCU) code data.

10. The display apparatus according to claim 1, wherein the write protection port transmits the signal to set the write protection state to permit the update of the stored first driving data after receiving the instruction to update the first driving data and prior to updating the stored first driving data with the received second driving data.

* * * * *